Patented Aug. 21, 1923.

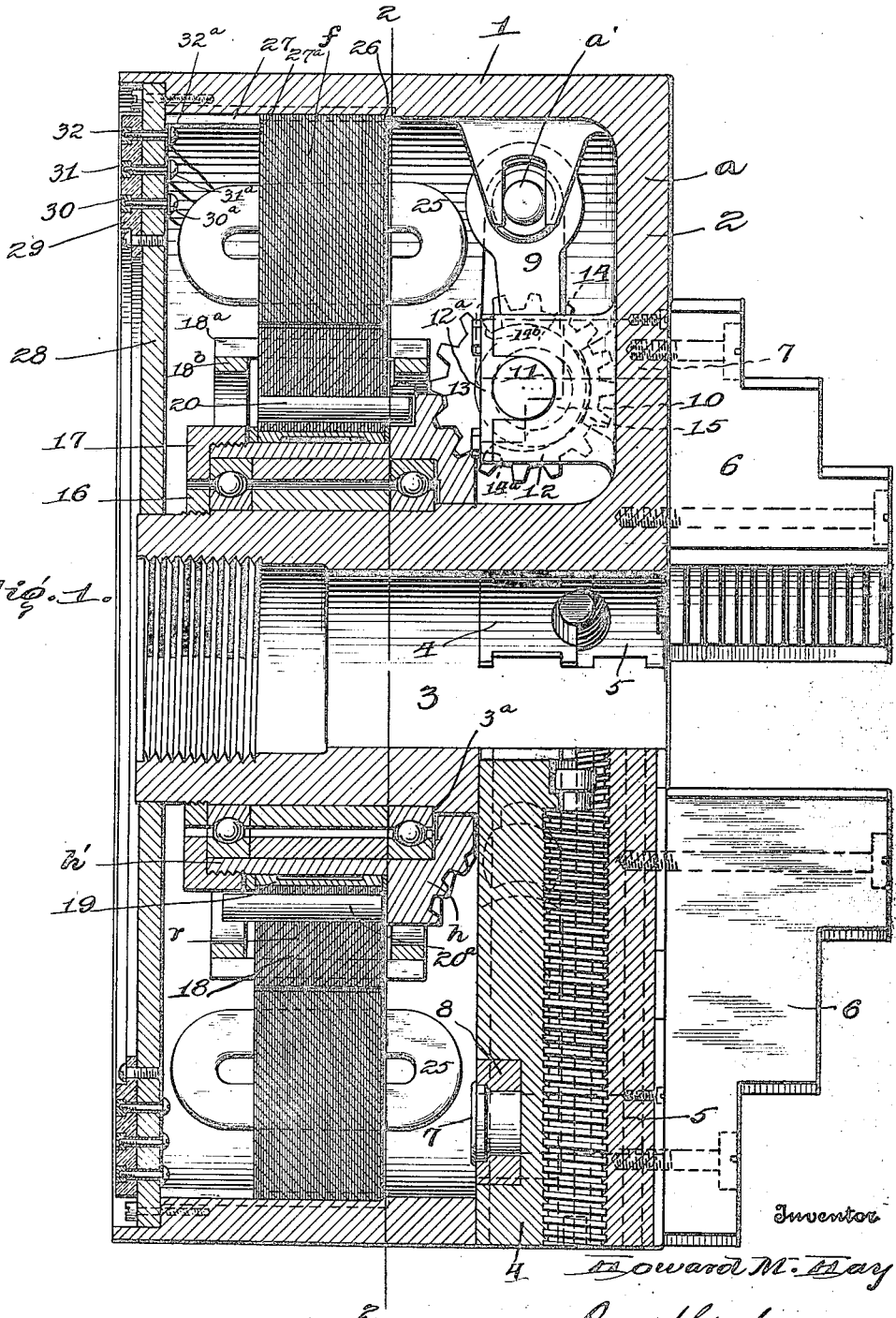

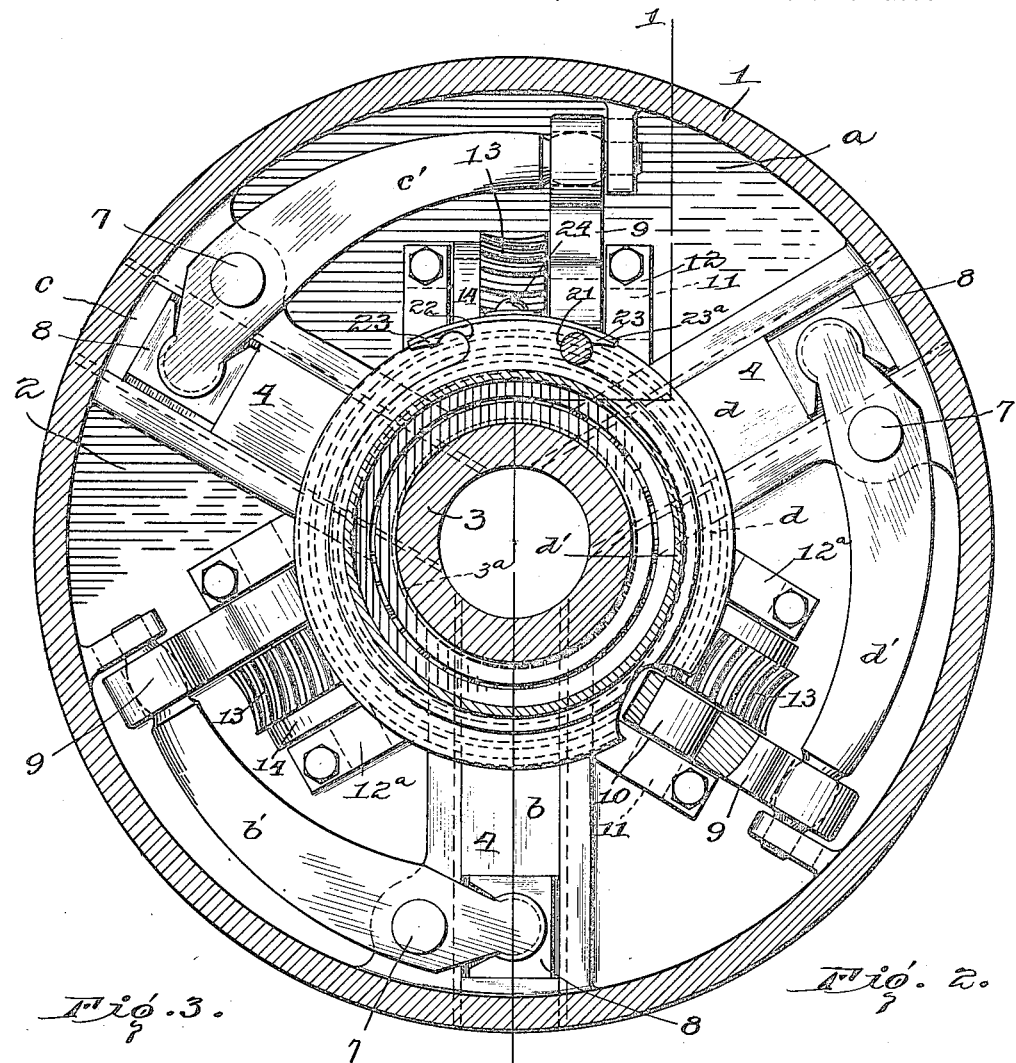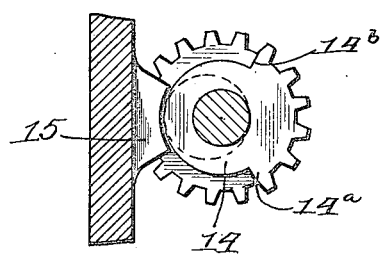

1,465,820

UNITED STATES PATENT OFFICE.

HOWARD MORTON HAY, OF WENONAH, NEW JERSEY.

POWER-OPERATED CHUCK.

Application filed February 8, 1921. Serial No. 443,340.

*To all whom it may concern:*

Be it known that I, HOWARD MORTON HAY, a citizen of the United States, residing at Wenonah, in the county of Gloucester and State of New Jersey, have invented certain new and useful Improvements in Power-Operated Chucks, of which the following is a specification.

This invention relates to improvements in power-operated lathe chucks. In carrying out the invention, I arrange within a hollow chuck body an electric motor, preferably of the induction type, the field and armature members both being of annular form, one member being fixed to the chuck body and the other member being rotatable about the hub. This latter member has a lost motion driving connection with a worm gear which is journaled on the hub, and this gear through suitable connections, moves the chuck jaws inwardly or outwardly, according to the direction in which the motor turns. The lost motion connection is provided in order that the motor may start freely and gain some momentum before engaging the worm gear, and in order that the gear may receive the impact of the motor to start it in case the parts become jammed. The parts are arranged so that they may all be contained within the chuck, between the hub and the outer wall thereof, thereby avoiding any obstruction of the central part of the chuck and permitting the work to be extended through the chuck into the hollow spindle of a lathe.

In the accompanying drawing,

Fig. 1 is a longitudinal section through the chuck approximately on the line 1—1 of Fig. 2;

Fig. 2 is a transverse section approximately on the line 2—2 of Fig. 1; and,

Fig. 3 is a transverse section through one of the cam shafts, showing the worm pinion and stops in side elevation.

Referring to the drawing, *a* indicates the chuck body comprising a hollow cylindrical shell having a peripheral wall 1, a face or front wall 2, and an internal hollow hub 3, the latter adapted to fit onto a lathe spindle. The chuck shown in the drawing is a universal chuck provided with three radially movable jaws, *b, c, d*, of usual construction, each consisting of a sliding part or back jaw 4, an adjustable part 5, and a stepped part 6. Levers *b', c', d'*, mounted on pivot pins 7, which project inwardly from the front or face wall of the body, are provided for the purpose of operating the jaws. The shorter arm of each lever engages a recess in a bearing block 8, with which each back jaw is provided, and the longer arms of the levers engage eyes in links 9, which extend inwardly toward the hub. The inner ends of the links are provided with eyes which encircle eccentrics 10 on short cam shafts 11, extending parallel with the front wall of the chuck and mounted in brackets 12 which project inwardly from said wall. These brackets are provided with caps $12^a$ which form part of the bearings for the shafts. Each shaft also carries a worm pinion 13 and an integral boss 14, (Fig. 3) having shoulders $14^a$ and $14^b$, which form stops adapted to engage a fixed stop 15 on the front wall of the chuck. The stops are so spaced as to permit the gear and cam shaft to rotate through an angle of 180°. With this arrangement, when one of the shoulders is against the fixed stop, the cam or eccentric will hold the longer arm of the operating lever in its outermost position and the corresponding jaw in its innermost position, and when the cam shaft is turned to bring the other shoulder against the fixed stop, said arm will be rocked to its innermost position and the jaw will be moved to its outermost position.

The several worm pinions are operated in unison by an annular worm gear *h*, which is rotatably mounted on the hub of the chuck and engages said pinions. As shown, the gear has a sleeve *h'* formed integral with it and mounted upon ball bearings upon the hub of the chuck. The inner ball raceways are held in position upon the hub, against a shoulder $3^a$, by a ring 16, threaded on to the hub, and a ring 17, threaded on the sleeve holds the sleeve and gear in position upon the outer ball raceways.

Within the chuck body, I arrange an electric motor, preferably of the induction type, comprising a field or stator *f*, secured to the outer wall of the chuck body, and an armature or rotor *r*, which is rotatably mounted upon the gear sleeve. The rotor comprises an annular laminated iron core 18, having a brass or bronze bushing 19 fitting within it and bearing upon the hub of sleeve $h'$ of the worm gear, so that the rotor and bushing may turn upon said sleeve. In the drawing, the rotor is shown as of the squirrel-cage type, having transverse conducting bars $18^a$ and short circuiting rings $18^b$. The rotor is also provided, at diametrically opposite points, with bars 20 and $20^a$, fitting in transverse openings in the core and projecting from opposite sides of the core, the projecting ends of these bars forming traction lugs for operating the worm gear. When the parts are assembled, only one of the bars engages the gear, the other bar being provided as a counterbalance and serving to engage and operate the gear in case the position of the rotor is reversed in assembling the parts. The back of the gear is provided with two shoulders or stops 21 and 22, close together, adapted to be engaged by the traction lug on the rotor, and it will be evident from the location of the stops that the rotor may make nearly one complete revolution without load, while the lug is moving from one stop to the other, and the impact of the rotor transmitted to the gear through the lug will dislodge the gear in case it is jammed. The gear and rotor will then move together until stopped, as hereinafter explained. When the traction lug engages one of the stops, it becomes latched to the gear by an adjacent spring latch 23, two of which are mounted upon the gear hub. As shown, the latches are at the ends of a flat spring $23^a$, which is centrally secured to the hub between the shoulders 21 and 22 by a screw 24.

The stator $f$ consists of an annular laminated core provided with suitable windings 25. The core fits closely within the shell or peripheral wall 1 and is held against an annular shoulder 26 by a key 27, which has a shoulder $27^a$ fitting against the core. This key locks the core against rotation relatively to the chuck body. The chuck body has an inner end plate 28 which carries an annular strip 29, of insulating material, on which contact rings 30, 31, and 32 are mounted. These contact rings are connected through binding posts $30^a$, $31^a$, and $32^a$ to the field coils of the motor. Current from the power source and controlling switches leads to the motor through fixed contact brushes (not shown) which engage the several conducting rings on the chuck body.

Normally, the traction lug on the motor is in engagement with one or the other of the stops 21, 22. When the motor is operated in one direction, the traction lug immediately moves away from its adjacent stop and the armature quickly swings the lug around against the other stop on the gear and the gear is thus given a blow and then travels with the rotor. The gear causes the worm pinions to turn in unison and the cams or eccentrics on the worm gear shafts cause the links to move and operate the levers to move the chuck jaws inward or outward, according to the direction of rotation of the motor. If there is no work within the jaws, the latter will move inward to their fullest extent, which is reached when the eccentrics on the cam shafts are swung to their outermost positions and the stops $14^a$ are against the stops 15. When the stops $14^a$ engage the stops 15, the motor becomes stalled and the increased current flow caused by the stoppage of the motor operates an automatic circuit breaker, not shown, to cut off current from the motor. If now, the motor is reversed and there is no work to be engaged by the outer steps on the chuck jaws, the rotor will move the traction lug quickly away from the shoulder 22 and this lug, after the motor has made nearly one revolution, will strike the shoulder 21 and the gear will then move with the motor and cause the operating levers to swing the jaws outwardly, through the medium of the worm pinions, eccentrics and links. When the jaws reach the limit of their outward movement, the shoulders $14^b$ on the pinions will engage the stops 15 and stall the motor as before. If any work is engaged by the jaws during their outward or inward movements, this will stop the movement of the jaws and cause the motor to stall before the shoulders $14^b$ or $14^a$ engage the fixed stops 15. It will be evident that through the medium of the worm gears, eccentrics and levers a very great pressure will be exerted by the jaws against the work before the motor becomes stalled. The purpose of allowing the motor to have a free movement before engaging the gear is to allow the motor to start without load and gain some momentum so that it will strike the gear a blow and start the gear in case the parts have become jammed by the pressure exerted through the various parts against the work. The latches which hold the traction lug in engagement with the shoulders 21 and 22 are provided for the purpose of holding the rotor in its position against one of the stops after the current has been cut off so that it will have its maximum movement in traveling to the other stop when the current is again applied, and also for detaining the rotor momentarily while the magnetic field is building up. The pressure therefore of the latches against the traction lug is relatively small.

It will be noted that the embodiment of the motor within the chuck does not obstruct the interior of the hub so that with this structure it is possible to extend the work through the hollow spindle of a lathe. I do not wish to limit myself to the induction type of motor for operating the jaws, although this type, because of absence of sliding contacts, is considered most desirable for the purpose.

What I claim is:

1. In a chuck, a hollow cylindrical body having an internal hub, an electric motor within the body and comprising field and armature members, one member fixed to the chuck body and the other rotatably mounted with respect to the body, and means operated by the latter member for moving the chuck jaws.

2. In a chuck, a hollow cylindrical body having an internal hub, an electric motor within the body and comprising annular field and armature members, one member fixed to the chuck body and the other rotatably mounted with respect to the body, and means operated by the latter member for moving the chuck jaws.

3. In a chuck, a hollow cylindrical body having an internal hub, a worm gear having a sleeve journaled upon the hub, an electric motor comprising field and armature members, one member fixed to the body and the other rotatable upon said sleeve, a lost motion driving connection between said latter member and the gear, and means operated by the gear for moving the chuck jaws.

4. In a chuck, a hollow cylindrical body having an internal hub, a worm gear having a sleeve journaled upon the hub, an electric motor comprising field and armature members, one member fixed to the body and the other rotatable upon said sleeve, a lost motion driving connection between said latter member and the gear, means for latching said rotatable member to the gear at the limits of their relative movements, and means operated by the gear for moving the chuck jaws.

5. In a chuck, a hollow cylindrical body having an internal hub, a worm gear rotatably mounted on the hub, an electric motor within the body for moving said gear, and means operated by said gear for moving the chuck jaws.

6. In a chuck, a hollow cylindrical body having an internal hub, a worm gear rotatably mounted on the hub, an electric motor within the body for moving said gear, pinions engaging said gear, and means operated by said pinions for moving the chuck jaws.

7. In a chuck, a hollow cylindrical body having an internal hub, a worm gear rotatably mounted on the hub, an electric motor comprising field and armature members, one of said members fixed to the body and the other mounted for rotation about the hub and adapted to drive the gear, and means operated by said gear for moving the chuck jaws.

8. In a chuck, a hollow cylindrical body having an internal hub, a worm gear rotatably mounted on the hub, an electric motor within the body for moving said gear, pinions engaging said gear, means operated by said pinions for moving the chuck jaws, and stops for limiting the movements of the gears when the jaws have moved a given distance.

9. In a chuck, a hollow cylindrical body having an internal hub, a worm gear rotatably mounted on the hub, an electric motor within the body comprising field and armature members, one fixed to the body and the other rotatable about the hub relatively to said gear, and stops on said latter member and the gear adapted to engage after said latter member has made a given initial movement.

10. A chuck body, movable gripping means supported thereby, said chuck body having an axial central opening therethrough, a prime mover comprising an annular rotor encircling said central opening, and means whereby rotary movement of the rotor may be rendered effective to operate the gripping means.

11. A chuck body having a tubular hub providing a central axial opening through said body, and an external shell forming an annular chamber surrounding said hub; movable gripping means on said body; a prime mover comprising an annular rotor encircling said hub, and transmission mechanism between the rotor and the gripping means.

12. A chuck body, movable gripping means thereon, a hub, a rotatable ring surrounding said hub, operative connections between said rotatable ring and the gripping means, an anti-friction band surrounding said ring, a prime mover comprising an annular rotor surrounding said ring and adapted to rotate to a limited extent with respect thereto, stop means on the ring and stop means on the rotor, and means for preventing axial movement of said ring.

13. A chuck comprising a chambered body, and a rotary motor mounted within said chambered body; movable gripping means on said body, and mechanical transmission means between said motor and said gripping means comprising a pair of cooperating threaded members, adapted to transmit the movement of the motor to said gripping means.

14. A chuck comprising a body and movable gripping means, a prime mover comprising a rotary motor on said body, and lost motion mechanical transmission means between the rotor of said motor and the gripping means.

15. A chuck comprising a body, movable gripping means thereon, a prime mover mounted on said body comprising an induction motor, and lost motion mechanical transmission means between the rotor of said motor and the gripping means.

16. A chuck comprising a body, movable gripping means thereon, an induction motor mounted on said body, transmission devices between the rotor of said motor and said gripping means adapted to move said gripping means positively in either direction, and a mechanical connection between the rotor and the transmission devices, of such character that lost motion between the rotor and the transmission devices may be had in either direction of rotation of the rotor.

17. A chuck body having a central hub and an outer shell forming an annular chamber, movable gripping means on the body, an induction motor housed within the annular chamber, comprising a stator and an annular rotor encircling the hub, means for transmitting motion from the rotor to the gripping means, a removable back plate closing the chamber, and slip rings on the back plate adapted to conduct current to the stator.

18. A chuck comprising, in combination, a body, jaws, and a jaw-actuating motor including two parts rotatable relative to each other, one of said parts secured to the chuck body and the other rotatable relative thereto.

19. A chuck comprising, in combination, a body, jaws, a jaw-actuating motor including two parts rotatable relative to each other, one of said parts secured to the chuck body and the other rotatable relative thereto, and gearing operatively interposed between the rotatable part of said motor and said jaws, said gearing providing lost motion to permit said motor to accelerate prior to picking up its full jaw-operating load.

20. In a chuck, a chuck-carried motor, jaws, and driving connections between said motor and jaws providing lost motion to permit said motor to accelerate prior to picking up its full jaw-operating load.

21. The combination with a chuck having jaws and a motor for operating the jaws, of gearing connections between said motor and jaws providing lost motion to permit said motor to accelerate prior to picking up its jaw-operating load.

22. The combination with a chuck having jaws and a motor for operating the jaws, of gearing connections between said motor and jaws providing lost motion independent of the back lash in the gearing to permit said motor to accelerate prior to picking up its jaw-operating load.

In testimony whereof I affix my signature.

HOWARD MORTON HAY.